US011900406B2

(12) United States Patent
Yeo

(10) Patent No.: US 11,900,406 B2
(45) Date of Patent: Feb. 13, 2024

(54) CONTROL METHOD, APPARATUS, AND COMPUTER PROGRAM FOR STOCHASTIC ITEM-PROVIDING SYSTEM

(71) Applicant: NEXON KOREA CORPORATION, Seongnam-si (KR)

(72) Inventor: Dong Soo Yeo, Gwangju-si (KR)

(73) Assignee: NEXON KOREA CORPORATION, Seongnam-si (KR)

(*) Notice: Subject to any disclaimer, the term of this patent is extended or adjusted under 35 U.S.C. 154(b) by 2 days.

(21) Appl. No.: 17/045,922

(22) PCT Filed: Mar. 18, 2019

(86) PCT No.: PCT/KR2019/003089
§ 371 (c)(1),
(2) Date: Oct. 7, 2020

(87) PCT Pub. No.: WO2020/013419
PCT Pub. Date: Jan. 16, 2020

(65) Prior Publication Data
US 2021/0035139 A1 Feb. 4, 2021

(30) Foreign Application Priority Data
Jul. 10, 2018 (KR) .................. 10-2018-0079957

(51) Int. Cl.
*G06Q 30/02* (2023.01)
*A63F 13/69* (2014.01)
(Continued)

(52) U.S. Cl.
CPC ......... *G06Q 30/0209* (2013.01); *A63F 13/69* (2014.09); *G06F 17/18* (2013.01);
(Continued)

(58) Field of Classification Search
CPC ............ G07F 17/3272; G06Q 30/0267; H04L 67/535; A63F 13/35
See application file for complete search history.

(56) References Cited

U.S. PATENT DOCUMENTS

2005/0159211 A1 7/2005 Englman
2008/0268943 A1* 10/2008 Jacob .................... A63F 13/211
463/43
(Continued)

FOREIGN PATENT DOCUMENTS

JP 2007102523 A 4/2007
JP 2013-075163 A 4/2013
(Continued)

OTHER PUBLICATIONS

International Search Report and Written Opinion dated Jun. 24, 2019 in International Patent Application No. PCT/KR2019/003089, filed Mar. 18, 2019, 10 pages.
(Continued)

*Primary Examiner* — Saba Dagnew
(74) *Attorney, Agent, or Firm* — Kilpatrick Townsend & Stockton LLP

(57) ABSTRACT

The present disclosure provides a method of controlling a probability of a probability-based item provision system, which includes measuring an amount of use of an item provision system during a first time interval, comparing the measurement result with a first threshold, and changing the probability of the item provision system within a predetermined range during a second time interval after the first time interval, based on a result of the comparing.

17 Claims, 11 Drawing Sheets

(51) Int. Cl.
*G06F 17/18* (2006.01)
*G06Q 20/12* (2012.01)
*G06Q 50/34* (2012.01)
*G06N 7/01* (2023.01)
*A63F 13/79* (2014.01)
*G06Q 30/0207* (2023.01)
*G06Q 30/0201* (2023.01)
*A63F 13/792* (2014.01)

(52) U.S. Cl.
CPC ............ *G06N 7/01* (2023.01); *G06Q 20/123* (2013.01); *G06Q 30/0201* (2013.01); *G06Q 50/34* (2013.01); *A63F 13/792* (2014.09); *A63F 2300/5546* (2013.01); *A63F 2300/609* (2013.01)

(56) References Cited

U.S. PATENT DOCUMENTS

| | | | | |
|---|---|---|---|---|
| 2011/0287832 | A1* | 11/2011 | Low | G07F 17/3295 463/25 |
| 2013/0151651 | A1* | 6/2013 | Chhaochharia | H04L 67/535 709/214 |
| 2014/0364194 | A1* | 12/2014 | Kusano | A63F 13/35 463/22 |
| 2016/0093134 | A1* | 3/2016 | Peters | G07F 17/34 463/20 |
| 2017/0068991 | A1* | 3/2017 | Lim | G06Q 30/0267 |
| 2020/0139245 | A1* | 5/2020 | Jarzebinski | A63F 13/67 |

FOREIGN PATENT DOCUMENTS

| | | | |
|---|---|---|---|
| JP | 2013094505 A | 5/2013 | |
| JP | 2015-217213 A | 12/2015 | |
| JP | 2018-000493 A | 1/2018 | |
| JP | 2018-042740 A | 3/2018 | |
| KR | 10-1128985 B1 | 3/2012 | |
| KR | 10-1205646 B1 | 11/2012 | |
| KR | 2012-0136973 A | 12/2012 | |
| WO | 2013/038590 A1 | 3/2013 | |

OTHER PUBLICATIONS

Office Action for Korean Application No. 10-2018-0079957 dispatched Jun. 23, 2023, all pages.
First Office Action Notification and Search Report for Chinese Application No. 201980026850.X dated May 26, 2023, all pages.

* cited by examiner

CONTROL METHOD, APPARATUS, AND COMPUTER PROGRAM FOR STOCHASTIC ITEM-PROVIDING SYSTEM

TECHNICAL FIELD

The present disclosure relates to a method of controlling a probability of an item provision system, and more particularly, to a method of controlling a probability of a probability-based item provision system.

BACKGROUND ART

With the development of computing devices and network environments, users who enjoy online-based games using various wired and wireless communication apparatuses are increasing significantly. Online games interest users by providing characters directly controlled by the users and items included in the characters.

In particular, online-based games of the related art provide items based on a probability when providing the items. That is, a user may acquire items through various paths while playing a game, but a game service provider does not provide the same item to all users and provides the same item or different items depending on a probability. Such a probability-based game item provision system typically includes a Gacha system or a upgrade system.

The Gacha system means a random pick-up system. The Gacha system is generally used in a sense similar to a random box, a capsule machine, and so on, and a user may obtain items of a predetermined grade depending on a probability.

The upgrade system is used to acquire a higher-level item based on an item owned by a user and may also acquire a higher item or fail based on a current item depending on a probability.

However, despite the fact that a probability-based game item provision system of the related art is used by a user in a game, it is difficult to find an appropriate probability depending on a provision condition of a game service, and as a result, there is a problem in that the number of uses of a user is gradually reduced.

Accordingly, there is a need to develop a control method of an improved game item provision system for maintaining the interest of a user and increasing sales and convenience of game service providers.

DESCRIPTION OF EMBODIMENTS

Technical Problem

The present disclosure is to provide a method of efficiently controlling a probability of a probability-based game item provision system.

Solution to Problem

The present disclosure controls a probability-based game item provision system with an appropriate probability.

Advantageous Effects of Disclosure

In the present disclosure, a probability of a probability-based game item provision system may be efficiently controlled.

BEST MODE

Figure 1:
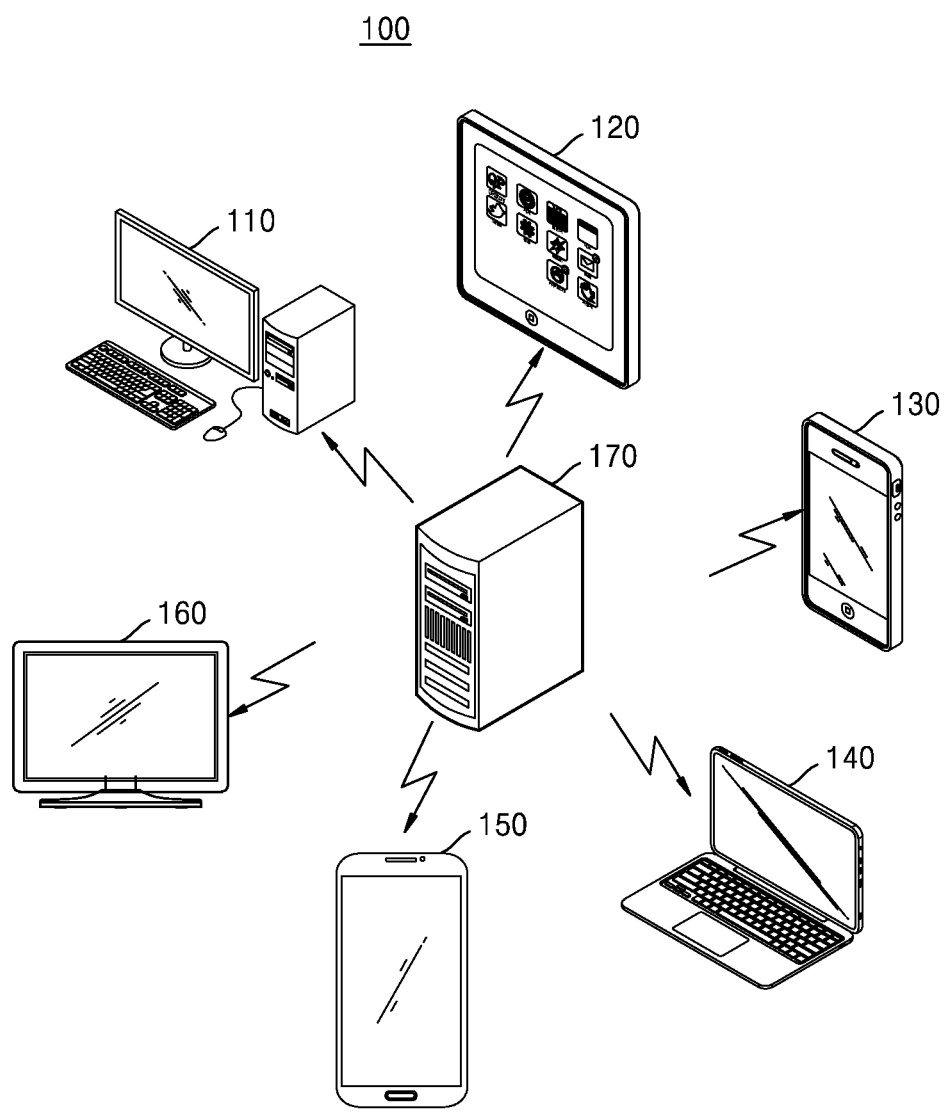
FIG. 1 illustrates a network system including a server and a user terminal, according to some embodiments.

A method of controlling a probability of a probability-based item provision system according to some embodiments of the present disclosure may include measuring the amount of use of an item provision system during a first time interval, comparing the measurement result with a first threshold, and changing the probability of an item provision system within a predetermined range during a second time interval after the first time interval, based on a result of the comparing.

The changing of the probability of the item provision system within a predetermined range may include: increasing the probability when the amount of use of the item provision system is less than or equal to the first threshold, and decreasing the probability when the amount of use of the item provision system exceeds the first threshold.

The method may further include providing information on the probability of the item provision system for each time interval.

The method may further include providing information on the first time interval and the measured amount of use of the item provision system during the first time interval in real time.

The amount of use of the item provision system may include the amount of use of a Gacha system, and the amount of use of the Gacha system may include at least one of the amount of goods used to purchase an item through the Gacha system, the number of purchases of the item through the Gacha system, and the number of users who purchase the item through the Gacha system.

The probability of the item provision system may include an item acquisition probability through the Gacha system.

The amount of use of the item provision system may include the amount of use of an item upgrade system, and the amount of use of the item upgrade system may include at least one of the amount of goods used for item upgrade, the number of upgrade attempts, and the number of users who attempt upgrade.

The probability of the item provision system may include an item acquisition probability through the item upgrade system.

The method may further include measuring the amount of use of the item provision system during the second time interval; comparing a measurement result during the second time interval with a second threshold; and changing the probability of the item provision system within a predetermined range during a third time interval after the second time interval, based on a result of the comparing of the measurement result during the second time interval with the second threshold.

The second threshold may be determined based on the amount of use of the item provision system during the first time interval, and the probability of the item provision system during the third time interval may be within a predetermined range of the probability of the item provision system during the second time interval.

Some embodiments of the present disclosure provide a computer-readable recording medium that records a program for implementing the method.

A server for controlling a probability of a probability-based item provision system according to the amount of use may include
  a processor that measures the amount of use of an item provision system during a first time interval, compares a result of the measuring with a first threshold, and changes the probability of the item provision system within a predetermined range during a second time interval after the first time interval based on a result of the comparing; a memory; and a communication unit.

The processor may increase the probability when the amount of use of the item provision system is less than or equal to the first threshold and may decrease the probability when the amount of use of the item provision system exceeds the first threshold.

The processor may control the communication unit to provide information on the probability of the item provision system for each time interval.

The processor may control the communication unit to provide information on the first time interval and the measured amount of use of the item provision system during the first time interval in real time.

The amount of use of the item provision system may include the amount of use of a Gacha system, and the amount of use of the Gacha system may include at least one of the amount of goods used to purchase an item through the Gacha system, the number of purchases of the item through the Gacha system, and the number of users who purchase the item through the Gacha system.

The probability of the item provision system may include an item acquisition probability through the Gacha system.

The amount of use of the item provision system may include the amount of use of an item upgrade system, and the amount of use of the item upgrade system may include at least one of the amount of goods used for item upgrade, the number of upgrade attempts, and the number of users who attempt upgrade.

The probability of the item provision system may include an item acquisition probability through the item upgrade system.

The processor may measure the amount of use of the item provision system during the second time interval, compare a measurement result during the second time interval with a second threshold, and change the probability of the item provision system within a predetermined range during a third time interval after the second time interval, based on a result of the comparing of the measurement result during the second time interval with the second threshold.

The second threshold may be determined based on the amount of use of the item provision system during the first time interval, and the probability of the item provision system during the third time interval may be within a predetermined range of the probability of the item provision system during the second time interval.

MODE OF DISCLOSURE

Hereinafter, example embodiments according to the present disclosure will be described in detail with reference to content described in the accompanying drawings. In addition, a method of configuring and using an electronic apparatus according to an embodiment of the present disclosure will be described in detail with reference to content described in the accompanying drawings. The same reference numerals or symbols illustrated in each drawing denote components or configuration elements that perform substantially the same function.

Although, terms including ordinal numbers such as "first" and "second" may be used to describe various components, but the component should not be limited by the terms. Terms are used only to distinguish one configuration element from other configuration elements. For example, a first component may be referred to as a second component without departing from the scope of the present disclosure, and similarly, the second component may also be referred to as the first component. As used herein the term "and/or" includes a combination of a plurality of related items or any one of a plurality of related items.

Terms used in the present specification are used to describe embodiments and are not intended to limit and/or restrict the present disclosure. A singular expression "a", "an" and "the" intended to include plural forms as well, unless the context clearly indicates otherwise. In the present application, it should be understood that terms such as include and have are intended to designate existence of features, numbers, steps, operations, elements, components, or a combination thereof described in the specification, and existence or addition possibility of one or more other features, numbers, steps, operations, configuration elements, components, or a combination thereof is not precluded.

Throughout the specification, when it is described that a portion is connected to another portion, this includes not only a case of being directly connected but also a case of being electrically connected to another element via the other element. In addition, when a part is described to "include" a certain configuration element, which means that the part may further include other configuration elements, except to exclude other configuration elements unless otherwise stated. In addition, a term " . . . unit", "module", or the like described in the specification means a unit for processing at least one function or operation, which may be implemented by hardware or software, or a combination of hardware and software.

In the following description of the present disclosure, items may include all of various objects in a game, such as apparatuses and products, and may mean equipment worn by in-game characters, such as weapons, armor, clothes, and crystals, a boarding machine that an in-game character boards, consumption goods such as food and potions, All digital cyber objects, which users may acquire in a game, such as experience points and buffs, and so on, and are not limited to the above-described examples.

In the following description of the present disclosure, a game object may mean a virtual object existing in a game space. For example, the game object may include a game character (for example, an avatar) of a user, a boarding machine (a vehicle) of a user, a pet of a user, and so on, but is not limited thereto, and may mean any object implemented within a game space such as a background or terrain.

In the following description of the present disclosure, the character may mean a predetermined object that may be controlled by a user in a game. Character information relates to a game character, and includes all types of information on the character, such as a level of the character, a grade of the character, a cumulative use time of the character, the amount that the character holds, the reputation of the character, a quest achievement rate of the character, and the achievement rate of the character, and is not limited to the above-described example.

In the following description of the present disclosure, a user account may mean an account of a user including at least one character. In a game, a user may create a plurality of characters, and the plurality of characters may depend on one user account. Of course, the user account is not limited to the above-described example, and there may also be a form of providing a game service through one user account. User account information may include a user's name, a phone number, an email address, a game use period, etc., and is not limited to the above-described example.

In the present disclosure, game goods may refer to goods that may be acquired by a user for free or on pay as currency used in a game. In other words, the game goods may mean all types of goods used for transaction and purchase in a game, such as items and game counts in the game. The game goods may include paid goods and free goods. The game goods may include multiple types of goods. The paid goods may include the multiple types of goods, and the free goods may also include the multiple types of goods.

In the following description of the present disclosure, a mission may be a quest or a request and may mean a task provided in a game. In other words, the mission may mean an action to achieve a given purpose in the game. In addition, one mission may consist of at least one submission (or sub-quest). In addition, the mission may include various types of missions.

In the following description of the present specification, a probability-based item provision service may mean a service in which provision of an item, a type of the item, and a grade of the item are determined according to a predetermined probability. That is, probability-based item provision service may have the same meaning as a probability-based item provision service.

The probability-based item provision service may include a Gacha service system (hereinafter referred to as a Gacha system) and a upgrade service system (hereinafter referred to as a upgrade system). Of course, the probability-based item provision service is not limited to the above-described example, and there is no limit on the type of the Gacha system and the upgrade system.

In the following description of the present specification, the Gacha system is a pick-up system and may include all of a random box, a capsule machine, and so on. A user does not purchase a desirable item directly and rather purchases an opportunity to pick up the item, and a probability determines whether or not an item is provided, a type and a grade of the item to be provided, and so on.

In addition, a Gacha event may mean an opportunity to pick up at least one of a plurality of items once or several times by using the Gacha system.

In the following description of the present specification, the upgrade system may include a system used to acquire a higher-level item based on an item owned by a user. For example, the upgrade system according to the present disclosure may include an item provision system based on all game objects owned by a user, such as upgrade (upgrade), combination, change, and attribute assignment of items, and is not limited to the above-described example. That is, a user who uses the upgrade system does not purchase a desirable item directly and rather purchases an opportunity to upgrade the item, and a probability determines whether or not a new item based on the item owned by the user is provided, whether or not an existing item is recovered, a type and a grade of an item to be provided, and so on.

In addition, a upgrade attempt may mean an opportunity to upgrade an item owned by a user once or several times by using the upgrade system.

In the following description of the present disclosure, a user may mean a gamer and is not limited to the above-described example.

In the following description of the present disclosure, that a server controls a user terminal may mean that the server makes an output (all output apparatuses of the user terminal, such as screen display, sound output, vibration output, and lamp emission) from the user terminal through communication with the user terminal and that the user terminal provides data for performing a predetermined operation. Of course, the server may also control the output from the user terminal by using the data previously stored in the user terminal and is not limited to the above-described example.

In the following description of the present disclosure, meaning of transmitting and receiving information or data to and from a user account may include meaning of transmitting and receiving information or data to and from a device (or user terminal) corresponding to or linked with the user account.

FIG. 1 illustrates a network system including a server and a user terminal according to some embodiments.

A network 100 according to the present disclosure may include a server 170 and at least one user terminal 110 to 160. The server 170 may provide various online activities through a network. The server 170 may simultaneously provide the online activities to at least one user terminal 110 to 160.

According to some embodiments, the server 170 may include a single server, a group of servers, a cloud server, and so on and is not limited to the example. The server 170 provides various online activities and may include a database that stores data for online activities. In addition, the server 170 may include a server that generates and processes payment events.

According to some embodiments, a network means a connection established (or formed) by using all communication methods and may mean a communication network that transmits and receives data between terminals or between a terminal and a server and that is connected through all communication methods.

All communication methods may include all communication types such as a predetermined communication standard, a predetermined frequency band, a predetermined protocol, or a communication through a predetermined channel. For example, all communication methods may include Bluetooth, Bluetooth low energy (BLE), Wi-Fi, Zigbee, $3^{rd}$ generation (3G), long term evolution (LTE), a communication method through ultrasound, and so on and may include short-range communication, long-distance communication, wireless communication, and wired communication. Of course, all communication methods are not limited to the above-described examples.

According to some embodiments, the short-range communication method may mean a communication method by which a communication may be performed only when a device (terminal or server) performing communication is within a predetermined range and may include, for example, Bluetooth, NFC, and so on. The long-distance communication method may mean a communication method by which a device performing communication may communicate regardless of a distance. For example, the long-distance communication method may mean a method by which two devices performing communication through a repeater such as an access point (AP) may communicate even when a distance between the two apparatuses is greater than or equal to a predetermined distance, and may include a communication method using a cellular network (3G, LTE) such as SMS and telephone. However, the present disclosure is not limited thereto. The meaning of receiving online activities by using a network may be that a communication between a server and a terminal may be performed through all communication methods.

Throughout the specification, at least one of the user terminals 110 to 160 may include a personal computer 110, a tablet 120, a cellular phone 130, a notebook 140, a smartphone 150, a television 160, as well as various electronic devices, such as, a personal digital assistant (PDA), portable multimedia player (PMP), a navigation device, MP3 players, digital cameras, refrigerators, washing machines, and vacuum cleaners, and is not limited to the above-described examples.

According to some embodiments, online activities may include online games, portal services, and social network service (SNS), and are not limited to the above-described examples. In addition, the online games may include various genres such as sports, massive multiplayer online role playing game (MMORPG), aeon of strife (AOS), first-person shooter (FPS), trading card game (TCG), and collectable card game (CCG). In addition, the online game may be a game of a user-to-user match method or may be a game of a user-to-computer (for example, artificial intelligence) match method. The online game may also be a game of construction or decoration an embellishment method rather than a confrontation method. Of course, the online game is not limited to the above-described example and there is no limitation to the form of the online game.

According to some embodiments, the server 170 measures the amount of use of an item provision system during a first time interval, compares the measurement result with a first threshold, and changes a probability of the item provision system during a second time interval after the first time interval within a predetermined range, based on the comparison result, and thus, a probability of a probability-based item provision system may be controlled.

In addition, according to some embodiments, at least one of the user terminals 110 to 160 may use the probability-based item provision system. For example, at least one of the user terminals 110 to 160 may use a Gacha system or an upgrade system based on a user input, and whether or not an item for a user account linked to at least one of the user terminals 110 to 160 is provided, an item type, a grade, and a number may be determined by a server. In addition, the at least one of the user terminals 110 to 160 may also display the amount of use and probability information of the probability-based item provision system. This will be described in more detail below.

Figure 2:
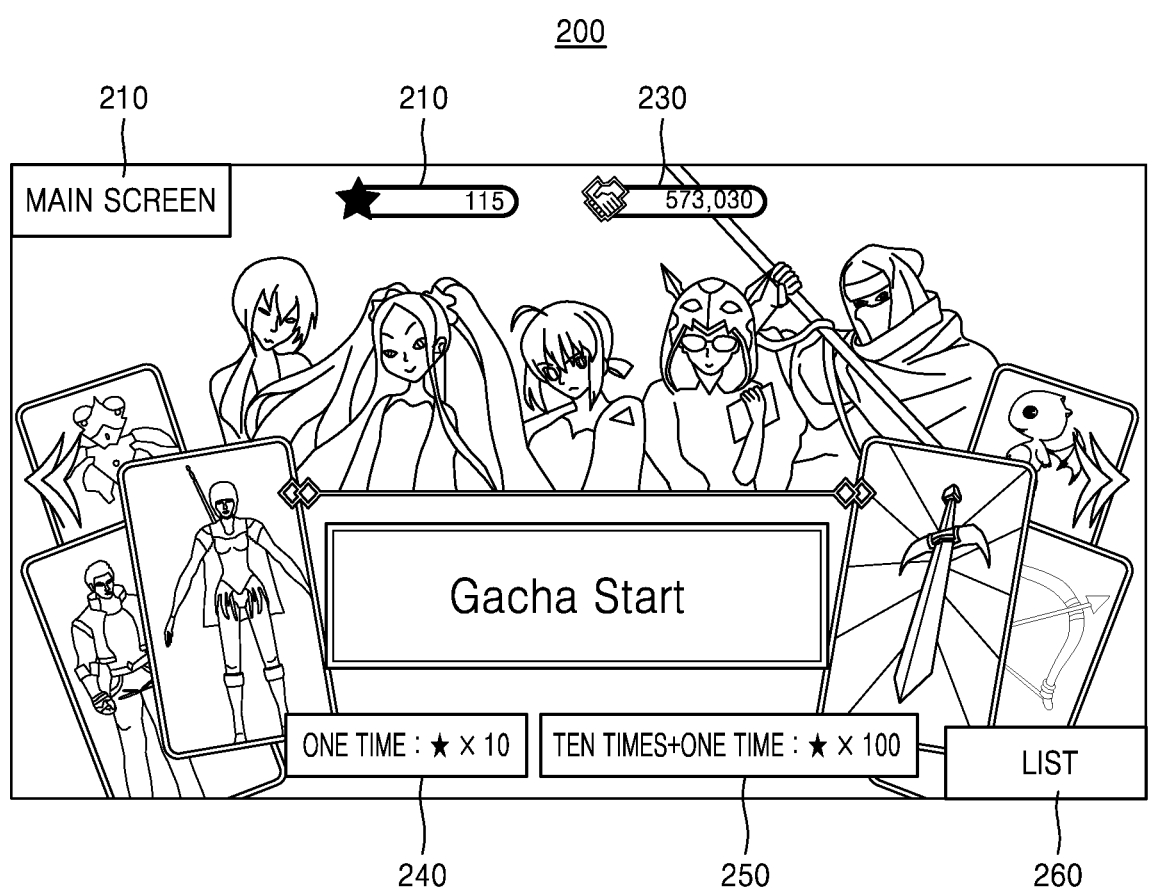
FIGS. 2 and 3 are views illustrating a Gacha system according to some embodiments.
Figure 3:
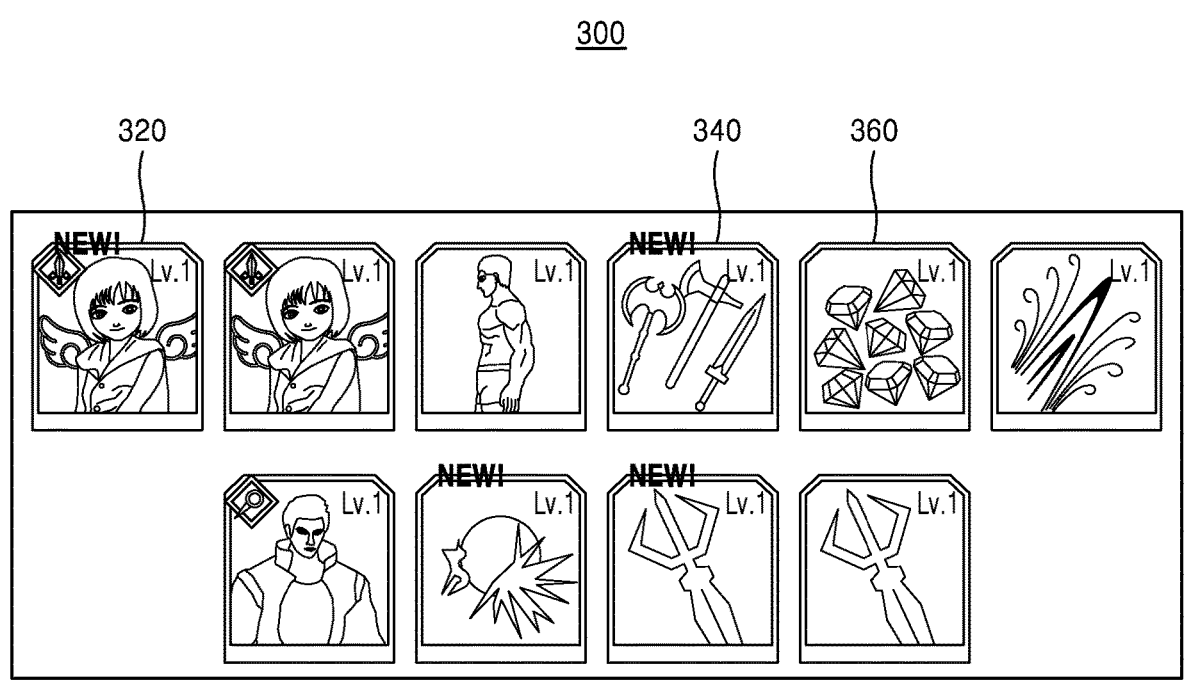

FIGS. 2 and 3 are diagrams illustrating a Gacha system according to some embodiments.

FIG. 2 illustrates a usage screen 200 of a Gacha system displayed on a user terminal. Various interfaces such as a button 210 to return to a main screen, a one-time Gacha event execution button 240, a 10+1-time Gacha event execution button 250, and an obtainable item list button 260 may be displayed on the usage screen 200 of the Gacha system.

For the sake of convenient description, use and results of the Gacha system will be described through an interface displayed on a user terminal. However, execution and result processing of a Gacha event according to a request for use of the Gacha system may be performed by a server.

According to some embodiments, the button 210 to return to the main screen may be a button for switching display on the user terminal to be switched from the usage screen 200 of the Gacha system to the main screen depending on a user's selection.

According to some embodiments, the one-time Gacha event execution button 240 may be a button that executes the Gacha event once, and referring to FIG. 2, the amount of game goods consumed in one-time Gacha event execution may be displayed together. Of course, the one-time Gacha event execution button 240 is not limited to the above-described example.

According to some embodiments, the 10+1-time Gacha event execution button 250 may be a button that executes the Gacha event 10 times, and referring to FIG. 2, the amount of game goods consumed in 10 times may be displayed together. A reason displayed as the number of times of 10+1 may mean that the number of executions of one Gacha event is additionally provided when ten Gacha events are executed. Of course, the 10+1-time Gacha event execution button 250 is not limited to the above-described example.

In addition, according to some embodiments, the obtainable item list button 260 may be a button for requesting display of a list including all or part of obtainable items according to execution of the Gacha event. The list of obtainable items may be displayed on a new screen through a pop-up screen or a screen change and is not limited to the above-described example.

In addition, according to some embodiments, various types of information for using the Gacha system may be displayed on the usage screen 200 of the Gacha system. Referring to FIG. 2, a quantity of first-type game goods 220 and a quantity 230 of second-type game goods 230 may be displayed on the usage screen 200 of the Gacha system.

According to some embodiments, game goods may mean all types of goods that are used for purchasing items in a game, the number of games that may be played, the opportunity of use of the Gacha system, and so on. There may be multiple types of game goods used in a single game. Referring to FIG. 2, the first-type game goods and the second-type game goods may exist, and the game goods are not limited to the above-described example. A user terminal may receive a user input and execute a Gacha event by using game goods owned by a user account based on the user input.

Of course, the usage screen 200 of the Gacha system is not limited to the illustration of FIG. 2, and less information than the information illustrated in FIG. 2 may be displayed, and more game information than the information illustrated in FIG. 2 may be displayed. In addition, unlike the interface illustrated in FIG. 2, fewer or more buttons may be displayed, and the displayed interface and information are not limited to the illustration of FIG. 2.

FIG. 3 is a view illustrating execution results of the Gacha system. FIG. 3 illustrates a result screen 300 obtained by executing the Gacha event with the Gacha system of FIG. 2.

As described above, when the user terminal receives a user input for clicking the one-time Gacha event execution button, game goods required for execution of the one-time Gacha event may be settled, charged, and paid, and thus, the Gacha event may be executed.

According to some embodiments, at least one item obtained by executing the Gacha event may be displayed on the result screen 300 according to the execution of the Gacha event. In addition, according to some embodiments, the number of items acquired according to the execution of the Gacha event is not limited. Although FIG. 3 illustrates that 10 items are acquired by executing the Gacha event once, the number of items acquired per Gacha event may differ depending on setting of the Gacha system and is not limited to the above-described example.

In addition, according to some embodiments, there are no restrictions on the type of items acquired by executing the Gacha event. The item acquired by executing the Gacha event may be a character or equipment and is not limited to the above-described example. A type of the item acquired by executing the Gacha event may correspond to a type of the Gacha event (for example, a weapon Gacha event, an armor Gacha event) set by the Gacha system and is not limited to the above-described example.

According to some embodiments, a user account acquires the item displayed on the result screen 300 according to execution of the Gacha event. An identifier NEW indicating items 320 and 340 that are not previously owned by the user account and an item 360 that is previously owned by the user account may be displayed on the result screen 300 according to the execution of the Gacha event. Of course, the result screen 300 according to the execution of the Gacha event is not limited to the above-described example and may also display or may also not display information on whether or not the user account is owned by comparing with an item owned by the existing user account, and a display form is also not limited to the content illustrated in FIG. 3.

As described above, the Gacha system is a kind of a probability-based item provision system, and an item acquired by a user account through the Gacha system may be determined by a probability determined by a server. Of course, the user account may or may not acquire an item according to the probability determined by the server. That is, the server may control whether or not the user account using the Gacha system acquires the item, and a probability of an item to be acquired. In addition, according to some embodiments, the server may control an item acquisition probability through the Gacha system based on the amount of use of the Gacha system.

According to some embodiments, the item acquisition probability through the Gacha system may include at least one of a probability of acquiring or failing to acquire an item as a result of using the Gacha system, a probability for each grade of items to be acquired as the result of using the Gacha system, a probability for each type of items to be acquired as the result of using the Gacha system, and a probability for each number of items to be acquired as the result of using the Gacha system, and is not limited to the above-described example.

According to some embodiments, the amount of use of the Gacha system may include the number of uses of the Gacha system. For example, the amount of use of the Gacha system may mean the number of times that the Gacha system is executed according to a click of the one-time Gacha event execution button 240 or the 10+1-time Gacha event execution button 250 displayed on the user terminal.

In addition, according to some embodiments, the amount of use of the Gacha system may include the number of users or the number of user accounts that use the Gacha system. For example, the amount of use of the Gacha system may include the number of users or the number of user accounts that execute the Gacha event through the Gacha system.

In addition, according to some embodiments, the amount of use of the Gacha system may include the amount of goods used to purchase items through the Gacha system. For example, the amount of use of the Gacha system may include the amount of game goods paid for execution of the Gacha event.

According to some embodiments, a server measures at least one of the amount of goods used to purchase an item through the Gacha system, the number of purchases of the item through the Gacha system, and the number of users who purchase the item through the Gacha system, thus, measuring the amount of use of the Gacha system and controlling a probability of the Gacha system based on the measured amount of use of the Gacha system.

Figure 4:
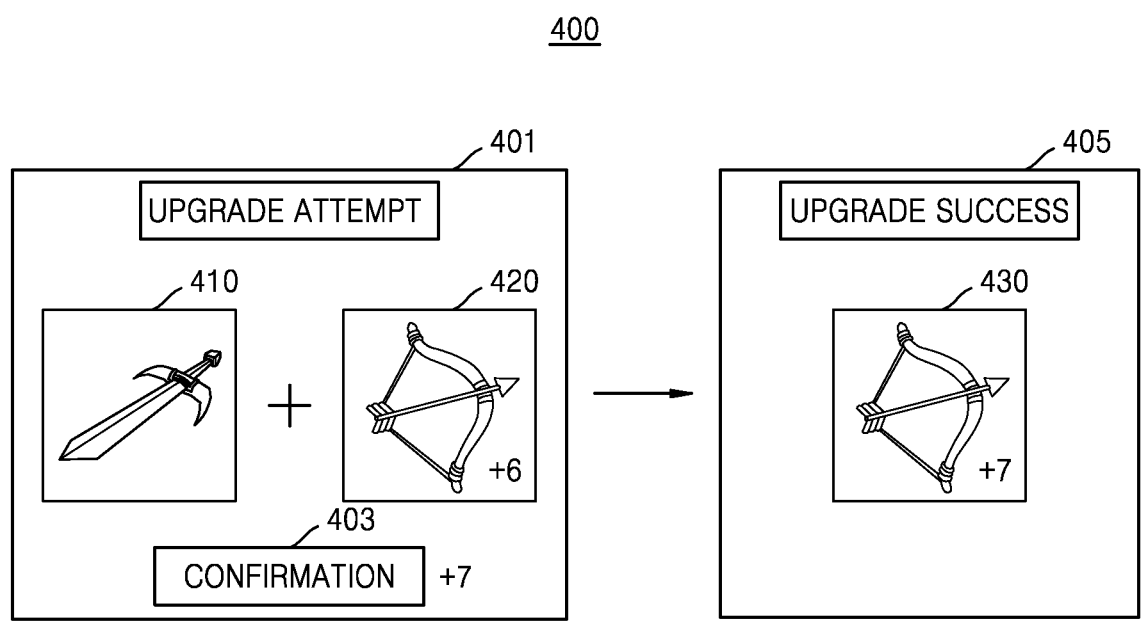
FIGS. 4 and 5 are views illustrating a upgrade system according to some embodiments.
Figure 5:
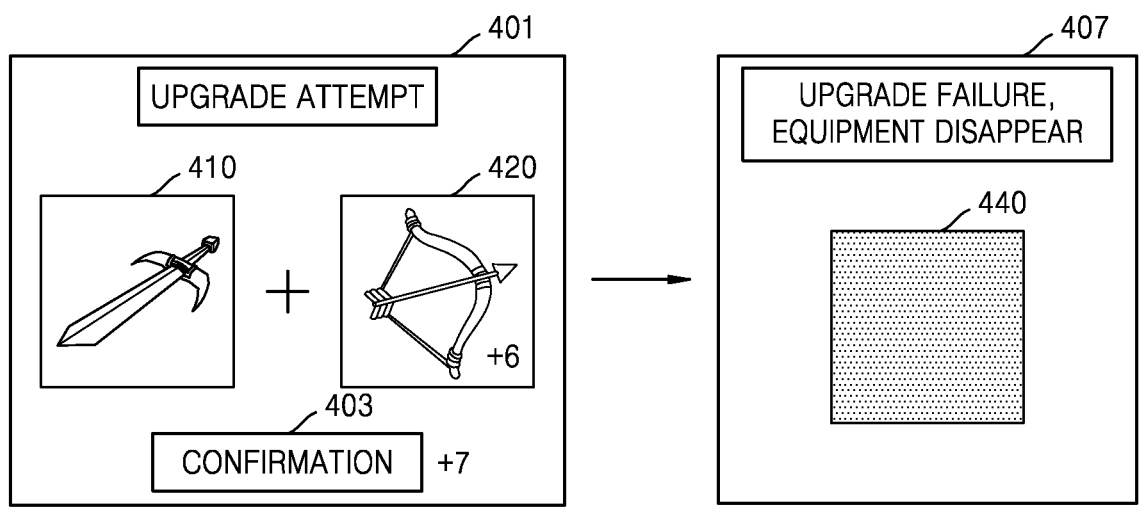

FIGS. 4 and 5 are views illustrating a upgrade system according to some embodiments.

According to some embodiments, a user terminal may receive a user input for using the upgrade system from a user. That is, the user may upgrade an item according to his/her choice. A server may receive a request to use the upgrade system from the user terminal.

For the sake of convenient description, use and results of the upgrade system will be described through an interface displayed on the user terminal. However, execution and result processing of upgrade attempt according to the request to use the upgrade system may be performed by a server.

FIG. 4 illustrates when a upgrade attempt result is successful. Referring to FIG. 4, a user terminal may receive a user input for using (that is, requesting upgrade attempt) a upgrade system.

According to some embodiments, the user terminal may use the upgrade system through a upgrade attempt interface 401. For example, in order to use the upgrade system, a user places a weapon upgrade scroll 410, which is a material item among the items owned by a user account, and a +6 frame bow 420, which is a upgrade attempt target item, in the upgrade attempt interface 401, and may click a confirmation button 403.

Of course, unlike in FIG. 4, when attempting upgrade, the weapon upgrade scroll 410, which is a material item, and the +6 frame bow 420, which is a upgrade attempt target item, may not be displayed in the upgrade attempt interface 401. That is, the upgrade attempt interface 401 may be different for each game.

In addition, each game may have different conditions for using a upgrade system. For example, whether or not game goods are required to use the upgrade system for each game, the amount of necessary game goods, whether or not a material item is needed, the amount of a necessary material item, and a condition (for example, a certain grade or higher) of a upgrade attempt target item may be different and are not limited to the above-described example.

According to some embodiments, the user terminal may transmit a upgrade attempt request to a server based on a user input received through the upgrade attempt interface 401. The server may receive the upgrade attempt request and the process upgrade attempt to acquire a result. Some of a series of operations for use of a upgrade system may be performed by a user terminal and are not limited to the above-described example.

According to some embodiments, a user wants to upgrade the +6 frame bow 420 to a +7 frame bow, thus, using the upgrade system. As described above, the upgrade system is a probability-based item provision system, and a upgrade attempt result is determined according to a success probability determined by a server.

Referring to FIG. 4, the upgrade result interface 405 displays the result of the upgrade attempt. The user terminal receives the upgrade attempt result from the server and displays the upgrade result interface 405 corresponding to the received upgrade result.

According to some embodiments, the +7 frame bow 430 is displayed on the upgrade result interface 405. In other words, after upgrade is successful, the +6 frame bow 420 owned by a user's character is changed to the +7 frame bow 430. Of course, as a result of the upgrade, a form and a shape of the interface 205 may be different for each game.

A server may delete the +6 frame bow 420 and store the +7 frame bow 430 in a database about items owned by a user account, that is, the server may update the database about the items owned by the user account by reflecting a result of upgrade attempt.

FIG. 5 illustrates when a upgrade attempt result fails. As illustrated in FIG. 5 or 4, a user terminal may receive a user input using a upgrade system through the upgrade attempt interface 401 and transmit a upgrade attempt request to a server.

However, unlike in FIG. 4, in FIG. 5, the upgrade fails and a user terminal shows the upgrade result interface 407 indicating failure of upgrade. Referring to FIG. 5, only an empty inventory space 440 is displayed on the upgrade result interface 407.

In other words, the upgrade fails, and the +6 frame bow 420 owned by a user's character disappears. A server may delete the +6 frame bow 420 in a database about items owned by a user account. That is, a server may update the database about the items owned by the user account by reflecting the upgrade attempt result.

Of course, the upgrade attempt result is not limited to FIG. 5. The upgrade attempt result may be different for each game. For example, even if upgrade fails, a upgrade attempt target item does not always disappear, and a grade of the upgrade attempt target item may be lowered or there may be no change in the upgrade attempt target item. That is, upgrade failure and success results may be different depending on setting of a server.

As described above, the upgrade system is a kind of a probability-based item provision system, and an item acquired by a user account through the upgrade system may be determined according to a probability determined by a server. That is, a success probability of the upgrade system may be determined by a server. The server may control a upgrade success probability, which is an item acquisition probability, through the upgrade system, based on the amount of use of the upgrade system.

According to some embodiments, the item acquisition probability through the upgrade system may include a upgrade attempt success probability, and the upgrade attempt success probability may include at least one of a success probability for each item type of upgrade attempt and a success probability for each item grade of upgrade attempt and is not limited to the above-described example.

According to some embodiments, the amount of use of the upgrade system may include the number of uses of the upgrade system. For example, the amount of use of the upgrade system may mean the number of upgrade attempts according to the click of the confirmation button 403 of the upgrade attempt interface 401.

In addition, according to some embodiments, the amount of use of the upgrade system may include the number of users or the number of user accounts using the upgrade system. For example, the amount of use of the upgrade system may include the number of users or the number of user accounts that attempt upgrade.

In addition, according to some embodiments, the amount of use of the upgrade system may include the amount of goods used to upgrade an item. For example, the amount of use of the upgrade system may include the amount of game goods used in upgrade attempt.

According to some embodiments, a server measures the amount of use of a upgrade system by measuring at least one of the amount of goods used to upgrade an item through a upgrade system, the number of times that item upgrade is attempted through the upgrade system, or the number of users using the upgrade system, and may control a probability of the upgrade system based on the measured amount of use of the upgrade system. For example, the server may decrease or increase a upgrade success probability when the number of upgrade attempts in a game during a predetermined period or the number of users that perform the upgrade attempt is high. Of course, the present disclosure is not limited to the above-described example.

Figure 6:
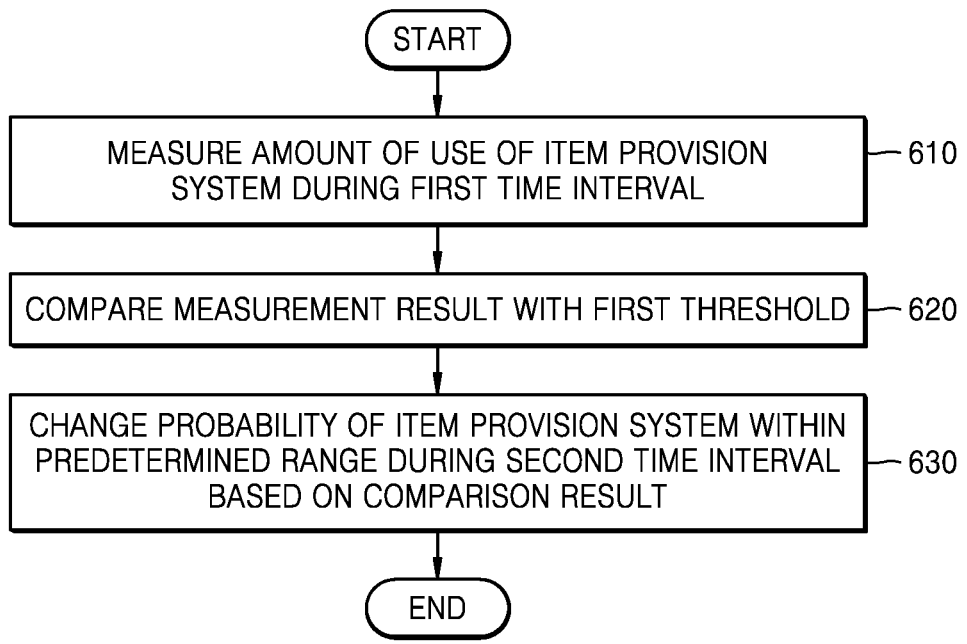
FIG. 6 is a flowchart of a method of controlling a probability-based item provision system by using a server, according to some embodiments.

FIG. 6 is a flowchart of a method, performed by a server, of controlling a probability-based item provision system, according to some embodiments.

In step 610, a server may measure the amount of use of the item provision system during a first time interval.

According to some embodiments, the first section may include an update period. The update period may be a period in which a probability of a probability-based game provision system is updated. The update period may be determined by setting of a server and may be changed depending on the amount of use. For example, the update period may be longer as the amount of use increases and may be shorter as the amount of use decreases. Of course, the update period is not limited to the above-described example.

According to some embodiments, an update period such as a first time interval may be determined based on information acquired through monitoring of a game. For example, a server may determine the update period based on at least one of information on an item provision system and information on a game acquired through monitoring such as the amount of use of a previous update time, a length of the previous update time, a ratio between the amount of use of the previous update time and an update time, the maximum number of game users, and the average number of game users, and.

That is, when the update period is too long, there is a possibility that a probability may not vary greatly depending on the amount of use, and when the update period is too short, the users may not use the item provision system within the update period sufficiently, and thus, a server may determine an appropriate period based on at least one piece of information on an item provision system acquired through monitoring.

As described above, the probability-based item provision system may include at least one of a Gacha system and an upgrade system, and the amount of use of an item provision system may include at least one of the amount of use of the Gacha system and the amount of use of the upgrade system.

According to some embodiments, the amount of use of the Gacha system may include at least one of the amount of goods used to purchase an item through the Gacha system, the number of purchases of the item through the Gacha system, and the number of users who purchase the item through the Gacha system. In addition, a probability of the item provision system may include an item acquisition probability through the Gacha system.

According to some embodiments, the amount of use of an item upgrade system may include at least one of the amount of goods used for item upgrade or the number of users who attempt upgrade. In addition, the probability of the item provision system may include an item acquisition probability through the item upgrade system.

According to some embodiments, a server may measure the amount of use of a probability-based item provision service in various ways. For example, the server may measure the amount of use of an item provision service by identifying the number of all users using a game provision service, the amount of game goods used through the game provision service, and a request to use the game provision service. Of course, the amount of use of the item provision service is not limited to the above-described example.

In step 620, a server may compare the measurement result with a first threshold.

According to some embodiments, a threshold may mean a reference value for determining whether to increase, maintain, or decrease a probability of the probability-based item provision service. The server may determine the probability of the item provision service by comparing the amount of use of the probability-based item provision service and the threshold.

According to some embodiments, the threshold may be determined by setting of the server.

According to some embodiments, the threshold may be determined based on information acquired through monitoring of a game. For example, the server may determine the threshold based on at least one of information on an item provision system and information on a game acquired through monitoring such as the amount of use of a previous update time, a length of the previous update time, a ratio between the amount of use of the previous update time and an update time, the maximum number of game users, and the average number of game users.

That is, when the threshold is too small or too large, the probability may be continuously increased or decreased. That is, the probability may be changed in only one direction, the server may determine an appropriate threshold based on at least one piece of information on an item provision system acquired through monitoring.

Of course, the threshold is not limited to the above-described example and may be determined based on the amount of use of an item provision system in a previous update time. For example, when the amount of use of the item provision system in the previous update time is more than a predetermined reference value, a threshold of a current update time may be less than a threshold of the previous update time, or when the amount of use of the item provision system in the previous update time is less than the predetermined reference value, the threshold of the current update time may be less than the threshold of the previous update time, and vice versa.

In step 630, a server may change a probability of an item provision system during a second time period within a predetermined range based on the comparison result. According to some embodiments, the second time period may be after the first time period.

According to some embodiments, the server may change the probability to be increased when the amount of use of the item provision system is less than or equal to the first threshold, and may change the probability to be decreased when the amount of use of the item provision system exceeds the first threshold. Of course, the probability of an item provision system is not limited to the above-described example and may also be maintained when the amount of use of the item provision system exceeds or is greater than or equal to a threshold depending on setting.

In addition, according to some embodiments, the server may measure the amount of use of the first time interval, adjust a probability of an item provision service in the second time interval by comparing the measured amount of use with the first threshold, and adjust a probability of the item provision service in a third time interval by comparing the measured amount of use with a second threshold.

According to some embodiments, the probability of the item provision service in the second time interval may be within a predetermined range of the probability of the item provision service in the first time interval, and the probability of the item provision service in the third time period may be within a predetermined range of the probability of the item provision service in the second time interval.

According to some embodiments, the predetermined range of a variation probability may be determined by setting of a server. Of course, the predetermined range of the probability is not limited to the above-described example and may be determined based on the amount of use of a previous update time. For example, when the amount of use of the item provision system in the previous update time is greater than a predetermined reference value, the predetermined range of the variation probability of the current update time may be 1%, and when the amount of use of the item provision system in the previous update time is less than the predetermined reference value, the predetermined range of the variation probability of the current update time may be 0.5%. Of course, the predetermined range of the probability to be changed is not limited to the above-described example.

That is, according to the present disclosure, at least one of a probability, a variation range of the probability, a time interval, and a threshold may be adjusted according to the amount of use of the item provision system.

In addition, according to some embodiments, at least one a probability, a variation range of the probability, a time interval, and a threshold may be adjusted by considering game information such as the maximum number of game users, the average number of game users, and game sales, together with or separately from the amount of use of an item provision system. In addition, each threshold and the probability of the item provision system may be stored in a table. A server may also determine the threshold and probability based on the stored table.

For example, when the number of uses of the item provision system does not exceed 100 times (threshold) during a time period of 1 minute, the server may increase an item provision probability of the item provision system by 1%. When the number of uses of the item provision system exceeds 100 times (threshold) during the time interval of 1 minute, the server may decrease the item provision probability by 0.5%.

In addition, even if a threshold time does not exceed 1 minute, when the number of uses exceeds 100 (threshold), the server may also set to immediately decrease the item provision probability by 0.5% and to start a next update time.

In addition, according to some embodiments, the server may provide information on the probability of the item provision system for each time interval and may also provide in real time the information on the first time interval and the amount of use of the item provision system during the measured first time interval.

Figure 7:
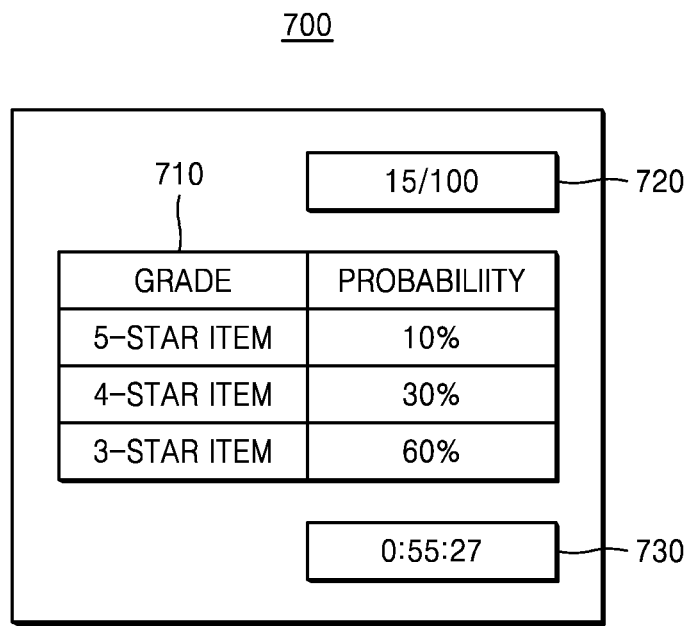
FIG. 7 is a diagram illustrating provision of information on the amount of use of a probability-based item provision system according to some embodiments.

FIG. 7 is a diagram illustrating provision of information on the amount of use of a probability-based item provision system according to some embodiments.

FIG. 7 illustrates a screen 700 of the amount of use of the probability-based item provision system displayed on a user terminal. The screen 700 on which the amount of use of the probability-based item provision system is displayed may include probability information 710 of the probability-based item provision system, use amount information 720 of the probability-based item provision system, and update time information 730. Of course, the screen 700 on which the amount of use of the probability-based item provision system is displayed is not limited to the above-described example and may also display more information or less information than the example of FIG. 7.

According to some embodiments, a server provides information on the amount of use of the probability-based item provision system to a user terminal, and the user terminal displays the amount of use of the probability-based item provision system based on information on the amount of use of the probability-based item provision system received from the server. The user terminal may display information on the amount of use of the probability-based item provision system through a pop-up window, a separate window through screen switching, and an interface of a screen within a game, according to a user input. Of course, the user terminal is not limited to the above-described example.

According to some embodiments, the probability information 710 of the probability-based item provision system may include probability information of an item provision system within a current update time. For example, probabilities illustrated in FIG. 7 may also be probabilities for each grade of an item to be acquired when using the Gacha system, or may also be upgrade success probabilities for each grade of an item when using a upgrade system.

According to some embodiments, the use amount information 720 of the probability-based item provision system may be information on the amount of use of the item provision system measured based on the current time. The use amount information 720 may be provided in real time and may be provided based on an update time. In other words, the use amount information 720 may be updated at predetermined time intervals, a new update time starts when the update time passes, and the use amount information 720 may be accumulated from 0 again.

According to some embodiments, the update time information 730 may include information on how long the update time remains and information on the update time interval. As described above, an update time may vary depending on setting of a server, and when the update time is exceeded, the probability information 710 of the probability-based item provision system and the use amount information 720 of the probability-based item provision system may be updated.

According to some embodiments, a user may determine a point in time to use an item provision system through the screen 700 displaying the amount of use of the probability-based item provision system displayed on a user terminal. That is, the user may predict a probability of the item provision system in the current update time or the next update time and may determine a point in time to use the item provision system according to the prediction result.

For example, a service provider controls the probability based on the amount of use of the probability-based item provision system, and when the probability information of the item provision system is provided to a user through the screen 700 displaying the amount of use of the probability-based item provision system of FIG. 7, the user may determine that the probability of the current update time is low, thus, waiting until the next update time, or may determine that the probability of the current update time is high, thus, using the item provision system before the next update time.

That is, the user may determine a point in time to use the item provision system considering the amount of use of users other than the user himself/herself and a degree of box office such as the number of users of a game, a market ranking of the game, and a sales ranking of the game. For example, when it is determined that the market ranking of the game is high and there is a high possibility that new users are continuously introduced, a user may also use the item provision system at the beginning of a game service up to a maximum limit that he/she may use.

In other words, users who predict that the amount of use of the item provision system will gradually increase will try to use the item provision system more times before the probability is adjusted (for example, decreased), and thus, the item provision system may be competitively used to increase game sales.

In addition, certain group users such as a guild, a party, and a race collaborate so as not to use the item provision system during a predetermined update time but may also use the item provision system during an update time after a probability is adjusted (for example, increased).

That is, by controlling the probability of the probability-based item provision system according to the amount of use, users may also compete or collaborate to use the item provision system with a desirable probability, and thus, fun of a game may be greatly increased.

Figure 8:
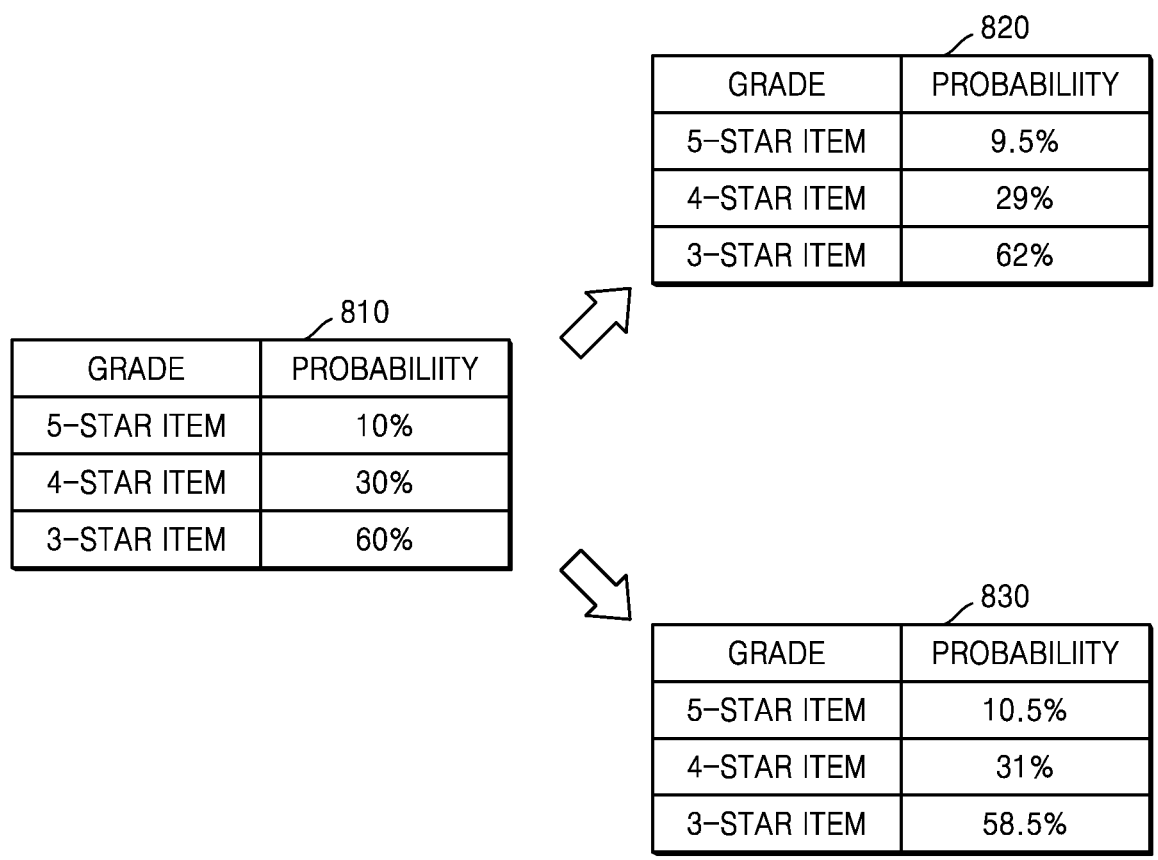
FIG. 8 is a diagram illustrating a change in probability of a probability-based item provision system depending on the amount of use, according to some embodiments.

FIG. 8 is a diagram illustrating a change in probability of a probability-based item provision system according to the amount of use according to some embodiments.

FIG. 8 illustrates probability information 810 of the probability-based item provision system in the first time interval (first update time), probability information 820 of the probability-based item provision system in the second time interval (second update time) when the amount of use of the item provision system in the first time interval exceeds a threshold, and probability information 830 of the probability-based item provision system in the second time interval (second update time) when the amount of use of the item provision system in the first time interval does not exceed the threshold.

Referring to FIG. 8, when the amount of use of the item provision system in the first time interval does not exceed the threshold, a server may increase a probability to encourage users to use the item provision system. In contrast to this, when the amount of use of the item provision system in the first time period exceeds the threshold, the probability may be decreased to increase sales. Of course, the server is not limited to the above-described example and may also increase a probability when the amount of use of the item provision system in the first time interval does not exceed a threshold.

That is, when an update time is exceeded, the server may control the probability according to whether or not the amount of use of the item provision system exceeds the threshold. In addition, according to some embodiments, the server may also set a new update time to start as soon as the amount of use of the item provision system exceeds the threshold. That is, although an update time is set to a predetermined time interval, the update time may also be set such that, as soon as the amount of use of the item provision system exceeds the threshold, a new update time starts and the varied probability is applied.

Figure 9:
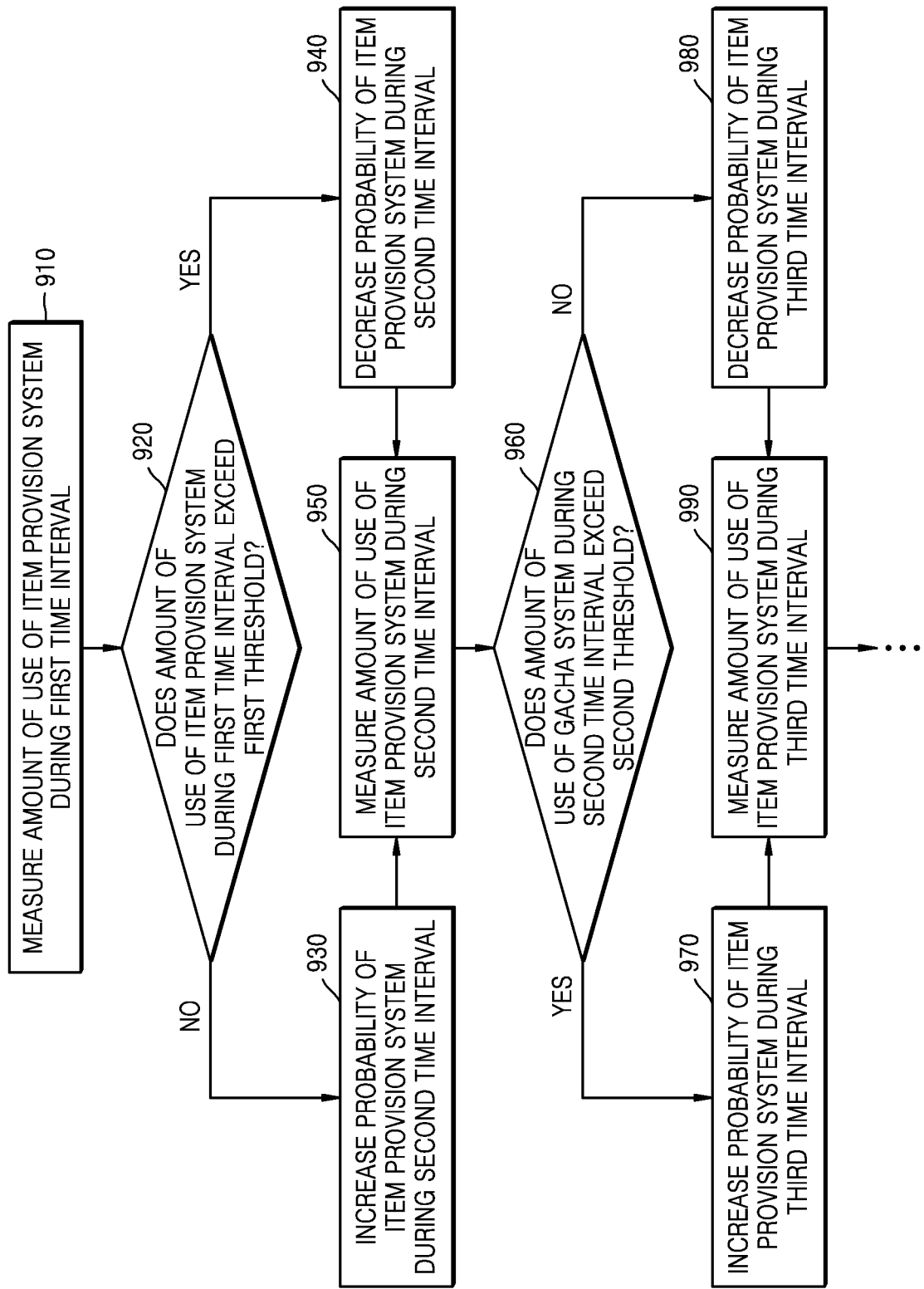
FIG. 9 is a detailed flowchart of a method of controlling a probability-based item provision system by using a server, according to some embodiments.

FIG. 9 is a detailed flowchart of a method of controlling a probability-based item provision system by using a server, according to some embodiments.

In step 910, the server may measure the amount of use of the item provision system during the first time interval. This corresponds to the above description, and thus, detailed description thereof is omitted.

In step 920, the server may determine whether or not the amount of use of the item provision system during the first time interval exceeds a first threshold. In other words, the server may measure the amount of use and compare the measurement result with the first threshold.

When the amount of use measured by the server during the first time interval exceeds the first threshold, the server performs step 930, and when the amount of use measured by the server does not exceed the first threshold, the server performs step 940.

In step 930, the server may increase a probability of the item provision system during the second time interval. According to some embodiments, the server may increase the probability of the item provision system in the second time interval based on the amount of use in the first time interval.

In step 940, the server may decrease the probability of the item provision system during the second time interval. According to some embodiments, the server may decrease the probability of the item provision system in the second time interval based on the amount of use in the first time interval.

As described above, the increase and decrease of the probability of the item provision system according to the amount of use of the item provision system may be set differently depending on an initial period, a medium period, a last period, update, and so on of a game service to be provided.

In step 950, the server may measure the amount of use of the item provision system during the second time period.

According to some embodiments, the second time interval is a time after the first time interval, and the first time interval may be the same time interval as the second time interval or may be a different time interval. In addition, the second time interval may be determined according to the amount of use of the item provision system in the first time interval.

In step 960, the server may determine whether or not the amount of use of the Gacha system during the second time interval exceeds a second threshold.

According to some embodiments, the second threshold may be the same as or different from the first threshold. In addition, the second threshold may be determined according to the amount of use of the item provision system in the first time interval.

When the amount of use during the second time interval measured by the server exceeds the second threshold, the server may perform step 970, and when the amount of use measured by the server does not exceed the second threshold, the server may perform step 980.

In step 970, the server may increase the probability of the item provision system during the third time interval.

In step 980, the server may decrease the probability of the item provision system during the third time interval.

In step 990, the server may measure the amount of use of the item provision system during a third time interval.

This corresponds to step 930, step 940, and step 950 described above, and thus, detailed description thereof is omitted.

That is, as illustrated in FIG. 9, the server measures the amount of use of the item-provision system in the current time interval and controls the probability of the item provision system in the next time interval, and thus, the probability of the item provision system may be controlled continuously, flexibly, and adaptively depending on the amount of use of the item provision system.

Figure 10:
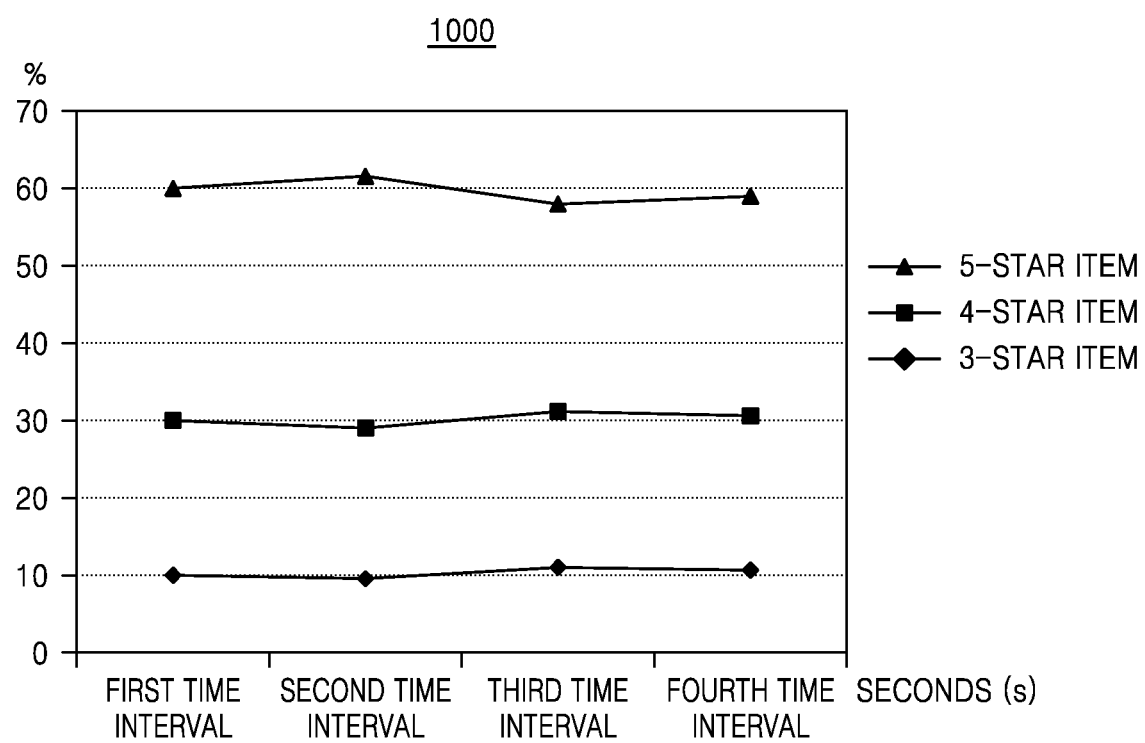
FIG. 10 is a diagram illustrating provision of probability change information of a probability-based item provision system according to some embodiments.

FIG. 10 is a graph illustrating provision of probability change information of the probability-based item provision system according to some embodiments.

FIG. 10 illustrates probability change information 1000 of the probability-based item provision system. A server may provide a user terminal with the probability change information 1000 of the probability-based item provision system.

According to some embodiments, the probability change information 1000 of the probability-based item provision system may include information on a change in a probability of the probability-based item provision system from a previous time interval (previous update time) to the current time interval (current update time).

FIG. 10 illustrates information on a change in probability for each grade of an item. Of course, the present disclosure is not limited to the above-described examples, and information on a change in probability for each type other than a change in probability for each grade may also be illustrated, and the change in probability for each grade and the change in probability for each type of an item may also be displayed at once.

According to some embodiments, the probability change information 1000 of the probability-based item provision system may also be displayed by a server, or data provided by the server may also be processed to be displayed by a user terminal.

Some embodiments may wait for use of an item provision system or may also use more the item provision system, based on the probability change information 1000 of the probability-based item provision system displayed on a user terminal, and may predict a probability of the item provision system in the next time interval. That is, a user considers the amount of use of other users for the highest item acquisition probability, thus, having a continuous interest in a game.

In addition, a game service provider may adaptively adjust a threshold and a time interval for updating a probability, and a probability change range by measuring the amount of use, and thus, sales may be increased.

Users who predict that the amount of use of the item provision system will increase gradually will try to use the item provision system more times before a probability is adjusted (for example, decreased), and thus, game sales may increase by competitively using the item provision system.

In addition, certain group of users such as guilds, parties, and races collaborate so as not to use the item provision system during a predetermined update time but use the item provision system during an update time after the probability is adjusted (for example, increased). That is, by controlling the probability of the probability-based item provision system according to the amount of use, users may also compete or collaborate to use the item provision system with a desirable probability, and thus, fun of a game may be greatly increased.

Figure 11:
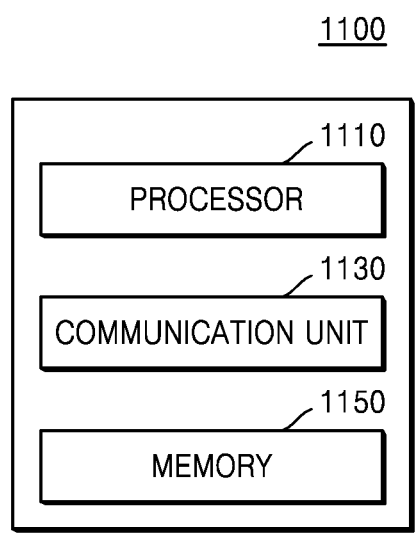
FIG. 11 is a diagram illustrating a detailed configuration of a server according to some embodiments.

FIG. 11 is a diagram illustrating a detailed configuration of a server according to some embodiments.

As illustrated in FIG. 11, a server 1100 according to some embodiments may include a processor 1110, a communication unit 1130, and a memory 1150. However, not all of the component illustrated in FIG. 11 are essential components of the server 1100. The server 1100 may also be implemented by more components than the components illustrated in FIG. 11, and the server 1100 may be implemented by fewer components than the components illustrated in FIG. 11.

According to some embodiments, the processor 1110 typically controls all operations of the server 1100. For example, the processor 1110 may control all configuration elements included in the server 1100 by executing a program stored in the server 1100.

According to some embodiments, the processor 1110 may measure the amount of use of the item provision system during the first time interval. In addition, the processor 1110 may compare the measurement result with a first threshold and change a probability of an item provision system during a second time interval after the first time interval within a predetermined range, based on the comparison result.

According to some embodiments, the processor 1110 may increase the probability when the amount of use of the item provision system is less than or equal to the first threshold, and decrease the probability when the amount of use of the item provision system exceeds the first threshold.

According to some embodiments, the processor 1110 may control the communication unit 1130 to provide information on the probability of the item provision system for each time interval.

According to some embodiments, the processor 1110 may control the communication unit 1130 to provide information on the first time interval and the amount of use of the item provision system during the measured first time interval in real time.

In addition, according to some embodiments, the processor 1110 may measure the amount of use of the item provision system during the second time interval, compare the measurement result during the second time interval with the second threshold, and change the probability of the item provision system during a third time interval after the second time interval within a predetermined range based on the measurement result during the second time interval and the comparison result of the second threshold.

According to some embodiments, the communication unit 1130 may perform communication through all methods, such as Bluetooth, BLE, near field communication, wireless local area network (WLAN), Zigbee infrared data association (IrDA), Wi-Fi Direct (WFD), ultra wideband (UWB), Ant+, LTE, 3G, 5th generation (5G), and so on regardless of communication methods.

According to some embodiments, the communication unit 1130 may provide information on the amount of use and a probability of the probability-based item provision system to a user terminal under the control of the processor 1110.

In addition, according to some embodiments, the communication unit 1130 may transmit and receive data to and from a server, and the data transmitted and received to and from the server may include control data for controlling a user terminal or a program included in the user terminal.

In addition, the memory 1150 may store a program for processing and controlling the processor 1110 and may also store data input to or output from the server 1100. According to some embodiments, the memory 1150 may also store information on a user account or information on a game.

According to some embodiments, the processor 1110 may perform an operation of controlling a probability of a probability-based item provision system according to the amount of use described above by using the program stored in the memory 1150.

According to some embodiments, the memory 1150 may include at least one type of storage media such as memories (for example, secure digital (SD) or extreme digital (XD) memory, etc.) of a flash memory type, a hard disk type, a multimedia card micro type, and a card type, random access memory (RAM), static random access memory (SRAM), read only memory (ROM), electrically erasable programmable read-only memory (EEPROM), programmable read only memory (PROM), a magnetic memory, a magnetic disk, and an optical disk. In addition, according to some embodiments, programs stored in the memory 1150 may be classified into a plurality of modules according to their functions.

In addition, according to some embodiments, a method of controlling a probability of a probability-based item provision system according to the amount of use may also be performed by the server 1100 and a user terminal 1200 separately or may also be performed by the server 1100 and the user terminal 1200 individually. That is, all of the above-described steps may also be performed by the server 1100, may also be performed by the user terminal 1200, or may also be performed by the server 1100 and the user terminal 1200 separately. In addition, at least one configuration included in the server 1100 may perform the embodiments described with reference to FIGS. 1 to 10.

Figure 12:
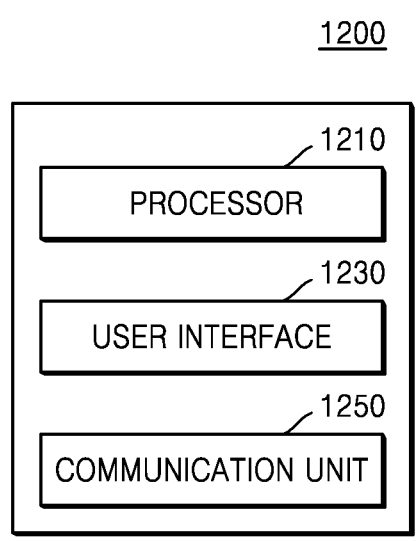
FIG. 12 is a diagram illustrating a detailed configuration of a user terminal according to some embodiments.

FIG. 12 is a diagram illustrating a detailed configuration of the user terminal according to some embodiments.

As illustrated in FIG. 12, the user terminal 1200 according to some embodiments may include a processor 1210, a user interface 1230, and a communication unit 1250. However, not all of the components illustrated in FIG. 12 are essential components of the user terminal 1200. The user terminal 1200 may also be implemented by more components than the components illustrated in FIG. 12, or the user terminal 1200 may be implemented by fewer components than the components illustrated in FIG. 12.

According to some embodiments, the processor 1210 typically controls the overall operation of the user terminal 1200. For example, the processor 1210 may execute a program stored in the user terminal 1200 to control overall configuration elements included in the user terminal 1200. In addition, the processor 1210 may control the user interface 1230 and the communication unit 1250.

According to some embodiments, the processor 1210 executes a program stored in the user terminal 1200 under the control of the server 1100, thereby, partially or entirely controlling a method of controlling a probability of a probability-based item provision system according to the amount of use. As described above, part or all of the method of controlling the probability of the probability-based item provision system according to the amount of use may be performed by the server 1100 or the user terminal 1200, and the steps performed by the user terminal 1200 may be performed under the control of the processor 1210 of the user terminal 1200.

According to some embodiments, the user interface 1230 may include various interfaces. For example, the user interface 1230 may include various interfaces, such as a key pad, a dome switch, a voice input interface, a fingerprint input interface, a touch input interface (a contact capacitance type, a pressure resistive film type, an infrared sensing type, a surface ultrasonic conduction type, an integral tension measurement type, a piezo effect type, etc.), a camera, a jog wheel, a jog switch, and so on, and may also link various sensors, such as an acceleration sensor, a position sensor, a temperature sensor, an optical sensor, etc. with the user interface. Of course, the user interface is not limited to the above-described example.

In addition, according to some embodiments, the user interface 1230 may also further include an output unit. The output unit may include at least one of is a liquid crystal display, a thin film transistor-liquid crystal display, an organic light-emitting diode, a flexible display, a three-dimensional (3D) display, and an electrophoretic display. When a display and a touch pad form a layer structure to configure a touch screen, the display may be used as an input apparatus in addition to an output apparatus. In addition, the output unit (not illustrated) may include an light emitting diode (LED) lamp, a vibration motor, a speaker, a flash, and so on, and is not limited to the above-described example.

In addition, according to some embodiments, the user interface 1230 may acquire a user input requesting use of a probability-based item provision service. In addition, the user interface 1230 may display at least one of various types of information on the amount of use and a probability of the probability-based item provision service received from the server 1100 through the communication unit 1250.

In addition, according to some embodiments, the user interface 1230 may output game notification information as an image, a video, sound, vibration, a lamp, and so on.

In addition, according to some embodiments, the communication unit 1250 may transmit a user input requesting use of the probability-based item provision service to a server and may also receive control information from the server.

According to some embodiments, the communication unit 1250 may include a Bluetooth communication unit, a BLE communication unit, a near field communication unit, a WLAN (Wi-Fi) communication unit, a Zigbee communication unit, an IrDA communication unit, a WFD communication unit, an UWB communication unit, an Ant+ communication unit, and so on, but is not limited thereto.

In addition, according to some embodiments, the communication unit 1250 transmits and receives a wireless signal to and from at least one of a base station, an external terminal, and a server through a mobile communication network. Here, the wireless signal may include various types of data according to transmission and reception of a voice call signal, a video call signal, or a text/multimedia message.

According to some embodiments, the user terminal 1200 may further include a memory (not illustrated). The memory may store various types of information, and a form the information stored in the memory is not limited.

According to some embodiments, the memory 1150 may include at least one type of storage media such as memories (for example, SD or XD memory, etc.) of a flash memory type, a hard disk type, a multimedia card micro type, and a card type, RAM, SRAM, ROM, EEPROM, PROM, a magnetic memory, a magnetic disk, and an optical disk. In addition, according to some embodiments, programs stored in the memory may be classified into a plurality of modules according to their functions.

The apparatuses described above may be implemented by hardware configuration elements, software configuration elements, and/or a combination of hardware configuration elements and software configuration elements. For example, the apparatuses and configuration elements described in the embodiments may be implemented by using one or more general-purpose computers or special-purpose computers, such as processors, controllers, arithmetic logic units (ALUs), digital signal processors, microcomputers, field programmable gate arrays (FPGAs), programmable logic units (PLUs), microprocessors, or any other apparatuses capable of executing and responding to instructions. A processing apparatus may perform an operating system (OS) and one or more software applications running on the operating system. In addition, a processing apparatus may also access, store, operate, process, and generate data in response to execution of software. For the sake of convenient understanding, one processing apparatus may be described as being used, but those skilled in the art may understand that the processing apparatus may include a plurality of processing elements and/or a plurality of types of processing elements. For example, the processing apparatus may include a plurality of processors or one processor and one controller. In addition, other processing configurations such as parallel processors are possible.

The software may include a computer program, codes, instructions, or a combination of one or more thereof, and may configure the processing apparatus to operate as desired or instruct the processing apparatus independently or collectively. The software and/or the data may be embodied permanently or temporarily in any type of machine, a configuration element, a physical apparatus, virtual equipment, a computer storage medium, an apparatus, or a signal wave to be transmitted to be interpreted by the processing apparatus or to provide instructions or data to the processing apparatus. The software may be distributed on computer system connected through a network to be stored or executed in a distributed manner. The software and data may be stored in one or more computer-readable recording media.

A method according to an embodiment may be implemented in a form of program instructions that may be executed by various computer means to be recorded on a computer-readable medium. The computer-readable medium may include program instructions, data files, data structures, or a combination thereof. The program instructions recorded on the medium may be specially designed and configured for the embodiment or may be known to and used by those skilled in computer software. For example, computer-readable recording media include magnetic media such as a hard disk, a floppy disk, and a magnetic tape, optical media such as CD-ROM and DVD, magnetic-optical media such as floptical disks, and a hardware apparatus specifically configured to store and execute program instructions, such as ROM, RAM, and flash memory. For example, the program instructions include not only machine language codes generated by a compiler but also high-level language codes that may be executed by a computer by using an interpreter and so on. The hardware apparatus described above may be configured to operate as one or more software modules to perform operations of the embodiments, and vice versa.

As described above, although the embodiments are described with reference to a limited embodiment and drawings, those skilled in the art may make various modifications and changes from the above description. For example, even if the described techniques are performed in a different order from the described method, the configuration elements of the described systems, structures, apparatuses, circuits, and so on are coupled combined in forms other than the described method, and/or insertion or replacement is made by another configuration element or equivalent, appropriate results may be achieved.

Therefore, other implementations, other embodiments, and equivalents to the claims are also involved in the scope of the following claims.

The invention claimed is:

1. A method for operating an item providing system of a game, the method comprising:
   providing information on a first probability of the item providing system during a first-time interval;
   in response to receiving a user input for using the item providing system during a first-time interval, selecting a first game item at random from among a plurality of candidate game items based on the first probability;
   providing the first game item; monitoring, in real time, a measured amount of use that the item providing system has been used during the first-time interval; providing information on the measured amount during the first time in real time;
   determining a first threshold amount of use that the item providing system has been used based on the measured amount; determining a probability range by comparing the first threshold to the measured amount; determining a second time based on the measured amount;
   changing the first probability to a second probability within the probability range for the second time interval; providing information on the second probability during the second time interval after the first-time interval;
   in response to receiving another user input for using the item providing system during the second time interval after the first-time interval, selecting a second game item at random from among the plurality of candidate game items based on the second probability; and
   providing the second game item, wherein the item providing system includes an item upgrade system, and wherein the amount that the item providing system has been used includes at least one of amount of goods used for item upgrade, a number of item upgrade attempts, and a number of users who attempt item upgrade.

2. The method of claim 1, wherein, the changing of the probability within the probability range comprises: increasing the first probability when the measured amount is less than or equal to the first threshold; and decreasing the first probability when the measured amount exceeds the first threshold.

3. The method of claim 2, further comprising: providing information on the first-time interval.

4. The method of The method of wherein the item providing system includes a Gacha system, and wherein the amount that the item providing system has been used includes at least one of an amount of goods used to purchase an item through the Gacha system, a number of purchases of the item through the Gacha system, and a number of users who purchase the item through the Gacha system.

5. The method of claim 4, wherein the first probability includes a probability of obtaining a game item through the Gacha system.

6. The method of claim 1, wherein the first probability includes a probability of obtaining a game item through the item upgrade system.

7. The method of claim 1, further comprising:
   measuring the amount that the item providing system has been used during the second time interval; re-changing the second probability to a third probability within the probability range, based on a result of comparing the measured amount during the second time interval with a second threshold;
   determining a third time interval in which the third probability is applied to the item providing system, based on the measured amount during the second time interval; and in response to receiving a user input for using the item providing system during the third time interval after the second time interval, providing a game item randomly selected from among the plurality of candidate game items based on the third probability.

8. The method of claim 7, wherein the second threshold is determined based on the measured amount during the first-time interval.

9. A server for operating an item providing system of a game, the server comprising:
   a communication unit;
   a memory storing instructions; and
   at least one processor functionally coupled with the communication unit and the memory and configured to execute the stored instructions to:
   provide information on a first probability of the item providing system during a first-time interval;
   in response to receiving a user input for using the item providing system during a first-time interval, selecting a first game item at random from among a plurality of candidate game items based on the first probability;
   providing the first game item; monitoring, in real time, a measured amount of use that the item providing system has been used during the first-time interval; provide information on the measured amount during the first time in real time,
   determine a first threshold amount of use that the item providing system has been used based on the measured amount; determine a probability range by comparing the first threshold to the measured amount; determine a second time interval based on the measured amount; provide information on the second probability during the second time interval after the first time interval;
   in response to receiving a user input for using the item providing system during the second time interval after the first-time interval, selecting a second game item at random from among the plurality of candidate game items based on the second probability; and
   provide the second game item, wherein the item providing system includes an item upgrade system, and wherein the amount of use that the item providing system has been used includes at least one of an amount of goods used for item upgrade, a number of item upgrade attempts, and a number of users who attempt item upgrade.

10. The server of claim 9, wherein the at least one processor is configured to execute the stored instructions to:
    increase the first probability when the measured amount is less than or equal to the first threshold, and decrease the first probability when the measured amount exceeds the first threshold.

11. The server of claim 10, wherein the at least one processor is configured to execute the stored instructions to: control the communication unit to provide information on the first-time interval.

12. The server of The server of wherein item providing system includes a Gacha system, and wherein the amount that the item providing system has been used includes at least one of an amount of goods used to purchase an item through the Gacha system, a number of purchases of the item through the Gacha system, and a number of users who purchase the item through the Gacha system.

13. The server of claim 12, wherein the first probability includes a probability of obtaining a game item through the Gacha system.

14. The server of claim 9, wherein the first probability includes a probability of obtaining a game item through the item upgrade system.

15. The server of claim 9, wherein the at least one processor is configured to execute the stored instructions to:
measure the amount that the item providing system has been used during the second time interval;
re-change the second probability to a third probability within the probability range, based on a result of comparing the measured amount during the second time interval with a second threshold;
determine a third time interval in which the third probability is applied to the item providing system, based on the measured amount during the second time interval; and
in response to receiving a user input for using the item providing system during the third time interval after the second time interval, providing a game item randomly selected from among the plurality of candidate game items based on the third probability.

16. The server of claim 15, wherein the second threshold is determined based on the measured amount during the first-time interval.

17. A non-transitory computer-readable recording medium that records a program for causing a computer to execute a method, the method comprising:
providing information on a first probability of the item providing system during a first-time interval;
in response to receiving a user input for using the item providing system during a first-time interval, selecting a first game item at random from among a plurality of candidate game items based on the first probability;
providing the first game item; monitoring, in real time, a measured amount of use that the item providing system has been used during the first-time interval;
providing information on the measured amount during the first time in real time;
determining a first threshold amount of use that the item providing system has been used based on the measured amount; determining a probability range by comparing the first threshold to the measured amount;
determining a second time based on the measured amount;
changing the first probability to a second probability within the probability range for the second time interval; providing information on the second probability during the second time interval after the first-time interval;
in response to receiving another user input for using the item providing system during the second time interval after the first-time interval, selecting a second game item at random from among the plurality of candidate game items based on the second probability; and
providing the second game item, wherein the item providing system includes an item upgrade system, and wherein the amount of use that the item providing system has been used includes at least one of an amount of goods used for item upgrade, a number of item upgrade attempts, and a number of users who attempt item upgrade.

* * * * *